United States Patent
Yoshida et al.

(10) Patent No.: US 6,708,668 B2
(45) Date of Patent: Mar. 23, 2004

(54) CONTROL SYSTEM AND METHOD FOR DIRECT-INJECTION SPARK-IGNITION ENGINE

(75) Inventors: Iwao Yoshida, Yokohama (JP); Takao Maitani, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 88 days.

(21) Appl. No.: 10/176,189

(22) Filed: Jun. 21, 2002

(65) Prior Publication Data

US 2003/0015168 A1 Jan. 23, 2003

(30) Foreign Application Priority Data

Jul. 17, 2001 (JP) ........................... 2001-216214

(51) Int. Cl.$^7$ ........................... F02D 41/30; F02D 41/40; F02D 37/02; F02P 5/10; F02P 5/15
(52) U.S. Cl. ................... 123/295; 123/299; 123/305; 60/285
(58) Field of Search .................... 123/295, 299, 123/305, 406.19, 406.23, 406.26, 406.44, 406.47, 443

(56) References Cited

U.S. PATENT DOCUMENTS 6,340,014 B1 * 1/2002 Tomita et al. ............... 123/295
6,510,834 B1 * 1/2003 Tomita et al. ............... 123/295

FOREIGN PATENT DOCUMENTS

JP  10-212987  8/1998

* cited by examiner

*Primary Examiner*—Henry C. Yuen
*Assistant Examiner*—Arnold Castro
(74) *Attorney, Agent, or Firm*—Foley & Lardner

(57) ABSTRACT

A control system for a direct-injection spark-ignition internal combustion engine is provided which includes a first control section for switchably controlling a combustion mode between a homogeneous combustion mode and a stratified stoichiometric combustion mode, and a second control section for advancing, at a time of switching from the homogeneous combustion mode to the stratified stoichiometric combustion mode, an ignition timing by an amount for offsetting a variation of torque simultaneously with switching of the combustion mode, gradually retarding the ignition timing after the switching of the combustion mode, and after the ignition timing has retarded a predetermined amount, retarding a compression stroke fuel injection timing in the stratified combustion mode while retarding the ignition timing further. A control method is also provided.

20 Claims, 8 Drawing Sheets

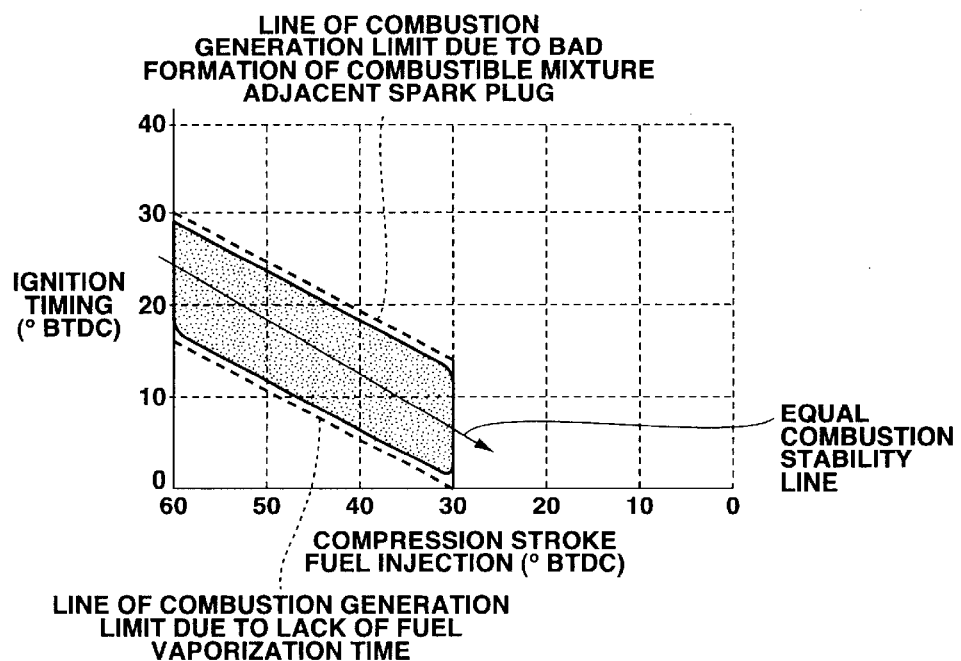
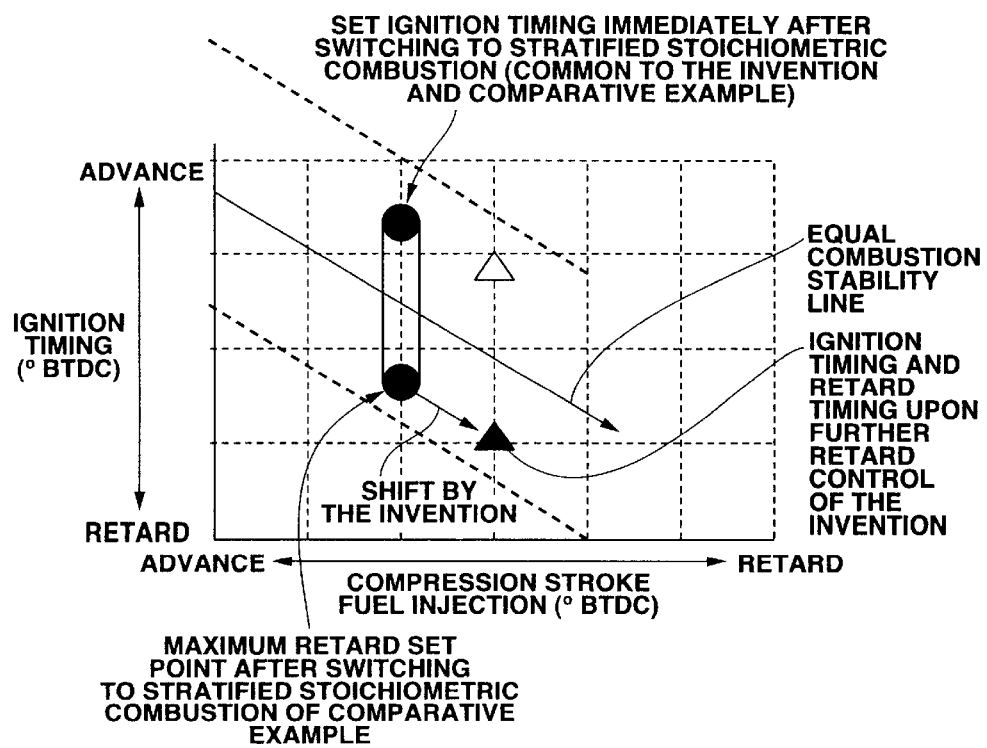

CONTROL SYSTEM AND METHOD FOR DIRECT-INJECTION SPARK-IGNITION ENGINE

BACKGROUND OF THE INVENTION

The present invention relates to a control system for a direct-injection spark-ignition internal combustion engine and particularly to an ignition timing control at the time of switching of a combustion mode of an engine whose combustion mode is switched in accordance with an operating condition of the engine. The present invention further relates to a method for controlling such an engine.

With a view to improving a fuel consumption of an engine and an exhaust gas purifying ability of a catalytic converter, it is recently used a direct-injection spark-ignition engine in which fuel is injected directly into a combustion chamber to perform stratified combustion.

For promoting activation of a catalytic converter by elevating the exhaust gas temperature, there has been proposed such a direct-injection spark-ignition engine in which fuel is injected in portions dividedly on the intake stroke and on the compression stroke thereby forming closely around a spark plug a stratified mixture of an air-fuel ratio richer than the stoichiometric air-fuel ratio and around the stratified mixture a mixture of an air-fuel ratio leaner than the stoichiometric air-fuel ratio as disclosed in Japanese Patent Provisional Publication No. 10-212987.

In such an engine, the relatively rich mixture around the spark plug is combusted at an initial combustion stage at an elevated combustion speed. Then, combustion proceeds to a main combustion stage in which the relatively lean mixture is combusted. This makes it possible to retard the ignition timing and cause excess fuel to be combusted adjacent the spark plug in a late combustion stage. Such retard of the ignition timing and late combustion of excess fuel makes it possible to suppress emissions of HC, Nox, etc. and elevate the exhaust gas temperature thereby promoting activation of the catalytic converter. In the meantime, in some case, the stratified mixture closely around the spark plug is formed so as to have an air-fuel ratio nearly equal to the stoichiometric air-fuel ratio. Combustion of a mixture formed in the above-described manner is hereinafter referred to as stratified stoichiometric combustion.

In an engine adapted to use stratified stoichiometric combustion when there is a demand for elevating an exhaust gas temperature, homogeneous combustion is used at cold start. The homogeneous combustion is the combustion of a homogeneous mixture formed within the entire combustion chamber and used for attaining stable combustion. Then, the above-described stratified stoichiometric combustion is used to meet with the demand for elevating the exhaust gas temperature. After the catalytic converter has been activated, the combustion mode is switched to homogeneous lean combustion. Further, in accordance with a demand on a operation of the engine, the combustion mode may be switched to stratified lean combustion or homogeneous stoichiometric combustion.

However, since the stratified stoichiometric combustion is lower in the thermal efficiency as compared with the homogeneous combustion that is the combustion of a mixture in which fuel and air are mixed up sufficiently, there occurs a sudden and sharp variation of torque at the time of switching from the stratified combustion to the homogeneous combustion or vise versa, thus causing a problem that the drivability is deteriorated.

To solve this problem, it is considered to correct the ignition timing at the time of switching of the combustion mode thereby suppressing the sudden and sharp variation of torque. For example, at the time of switching from homogeneous combustion to stratified stoichiometric combustion, the sudden and sharp variation of torque can be suppressed by advancing the ignition timing by a predetermined amount simultaneously with the switching of the combustion mode. After the switching of the combustion mode, the ignition timing is gradually retarded to an allowable torque range (stable combustion limit) so that the stratified stoichiometric combustion can produce an exhaust gas temperature elevating effect.

SUMMARY OF THE INVENTION

However, in the above-described method (referred to as a comparative example in the drawings), the ignition timing after final retard that meets the allowable torque range is determined based on the operating condition (fuel injection timing, fuel injection quantity) that is determined in consideration of suppression of the sudden and sharp variation of torque at the time of switching of the combustion mode. For this reason, the ignition timing cannot be retarded to an optimum timing in stratified stoichiometric combustion, thus being incapable of maximizing the activation effect of the catalytic converter by an elevated exhaust gas temperature.

It is accordingly an object of the present invention to provide a control system for a direct-injection spark-ignition engine that can eliminate a sudden variation of torque and can maximize the catalyst activation effect by the stratified stoichiometric combustion.

To achieve the above object, there is provided according to an aspect of the present invention a control system for a direct-injection spark-ignition internal combustion engine comprising a first control section for switchably controlling, in accordance with an operating condition of the engine, a combustion mode of the engine between a homogeneous combustion mode wherein a homogeneous air-fuel mixture is formed in an entire combustion chamber by single injection of fuel and a stratified stoichiometric combustion mode wherein a rich air-fuel mixture of an air-fuel ratio equal to or richer than a stoichiometric air-fuel ratio is formed around a spark plug by injection of fuel on a compression stroke and a lean air-fuel mixture of an air-fuel ratio leaner than the stoichiometric air-fuel ratio is formed around the rich air-fuel mixture by injection of fuel on an intake stroke, and a second control section for advancing, at a time of switching from the homogeneous combustion mode to the stratified stoichiometric combustion mode, an ignition timing by an amount for offsetting a variation of torque of the engine simultaneously with the switching of the combustion mode, retarding the ignition timing gradually after the switching of the combustion mode, and retarding, after the ignition timing has been retarded by a predetermined amount, a compression stroke fuel injection timing in the stratified stoichiometric combustion mode while retarding the ignition timing further.

According to another aspect of the present invention, there is provided a method of controlling a direct-injection spark-ignition internal combustion engine comprising switchably controlling, in accordance with an operating condition of the engine, a combustion mode of the engine between a homogeneous combustion mode wherein a homogeneous air-fuel mixture is formed in an entire combustion chamber by single injection of fuel and a stratified stoichiometric combustion mode wherein a rich air-fuel mixture of an air-fuel ratio equal to or richer than a stoichiometric air-fuel ratio is formed around a spark plug by injection of fuel on a compression stroke and a lean air-fuel mixture of an air-fuel ratio leaner than the stoichiometric is formed around the rich air-fuel mixture by injection of fuel on an intake stroke, and advancing, at a time of switching from the homogeneous combustion to the stratified stoichiometric combustion, an ignition timing by an amount for offsetting a variation of torque of the engine simultaneously with switching of the combustion mode, retarding the ignition timing gradually after the switching of the combustion mode, and retarding, after the ignition timing has been retarded by a predetermined amount, a compression stroke fuel injection timing in the stratified stoichiometric combustion mode while retarding the ignition timing further.

BRIEF DESCRIPTION OF THE DRAWINGS

FIG. 2 is a diagrammatic view for illustrating a principle of an ignition timing retard control for stratified stoichiometric combustion according to the present invention;

FIG. 3 is a diagrammatic view for illustrating an ignition timing retard control for stratified stoichiometric combustion according to the present invention;

DESCRIPTION OF THE PREFERRED EMBODIMENTS

Figure 1:
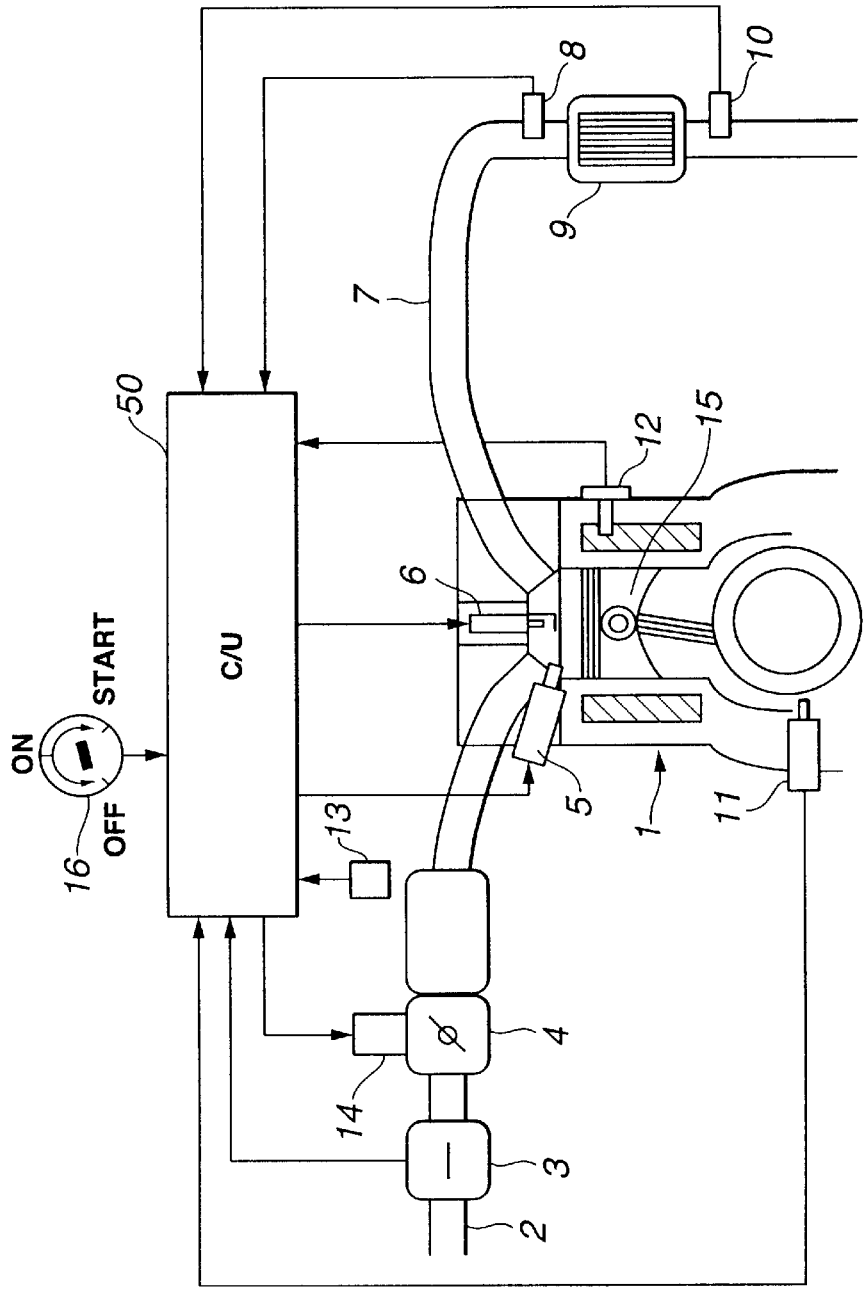
FIG. 1 is a schematic view of a direct-injection spark-ignition engine and a control system therefor.

Referring first to FIG. 1, a direct-injection spark-ignition internal combustion engine is generally indicated by 1 and includes intake passage 2 provided with airflow meter 3 and throttle valve 4. Airflow meter 3 detects intake airflow rate Qa, and throttle valve 4 controls intake airflow rate Qa.

Fuel injectors 5, though only one is shown, are provided for respective cylinders of engine 1. Fuel that is regulated to a predetermined pressure by a pressure regulator (not shown) is transmitted to injectors 5 by a fuel pump (not shown). Each injector 5 is operated in response to a signal from control unit 50 and injects fuel directly into combustion chamber 15 of each cylinder.

Spark plugs 6, though only one is shown, are provided for the respective cylinders and ignite an air-fuel mixture in response to a signal from control unit 50.

On the other hand, exhaust passage 7 is provided with air-fuel ratio sensor 8 and catalytic converter 9 disposed downstream of air-fuel ratio sensor 8. Air-fuel ratio sensor 8 detects the concentration of a particular component such as oxygen in the exhaust gas thereby detecting an air-fuel ratio of the exhaust gas and therefore an air-fuel mixture. Air-fuel ratio sensor 8 may be an oxygen sensor that produces an output indicating that the air-fuel ratio is rich or lean, or may be a wide-range air-fuel ratio sensor that detects the air-fuel ratio over a wide range from lean to rich. Catalytic converter 9 may use a three-way catalyst that can oxidize CO and HC and reduce Nox in the exhaust gas when the air-fuel ratio is at or adjacent the stoichiometric (i.e., $\lambda=1$ and A/F (mass ratio of air to fuel) is about 14.7), or may use an oxidizing catalyst that oxidizes CO and HC in the exhaust gas or may use a NOx trap catalyst that functions as a three-way catalyst when the air-fuel ratio is adjacent the stoichiometric air-fuel ratio, traps Nox in the exhaust gas when the air-fuel ratio is lean and releases Nox when the air-fuel ratio is the stoichiometric air-fuel ratio or rich.

Further, disposed in exhaust passage 7 on the downstream side of catalytic converter 9 with respect to the flow of exhaust gas is downstream side oxygen sensor 10 for detecting the concentration of a particular component such as oxygen in the exhaust gas and produces a signal indicating that the air-fuel ratio is lean or rich.

Herein, engine 1 is provided with a so-called duel air-fuel ratio sensor system for correcting, based on the detection value of downstream side oxygen sensor 10, an air-fuel ratio feedback control that is performed based on the detection value of air-fuel ratio sensor 8, thereby suppressing a control error due to deterioration of air-fuel ratio sensor 8. However, downstream oxygen sensor 10 can be dispensed with in case an air-fuel ratio feedback control based on a detection value of air-fuel ratio sensor 8 will do. Further, both of air-fuel ratio sensor 8 and downstream side oxygen sensor 10 can be dispensed with in case it is not necessary to perform an air-fuel ratio feedback control.

Air-fuel ratio sensor 8 disposed upstream of catalytic converter 9 has a small heat capacity. Thus, air-fuel ratio sensor 8 is activated quite faster as compared with catalytic converter 9. Further, since the temperature of air-fuel ratio sensor 8 can be forcedly elevated or activated by using an electric heater or the like, it is possible to perform an air-fuel ratio feedback control based on the result of detection by air-fuel ratio sensor 8 during stratified stoichiometric combustion (during warming-up of catalytic converter 9).

Thus, in this embodiment, air-fuel ratio sensor 8 is activated immediately after start of engine 1 and a feedback control is performed based on the detection value of air-fuel ratio sensor 8 so that at the time of the stratified stoichiometric combustion mode that will be described herein later, the air-fuel ratio can be the stoichiometric air-fuel ratio throughout combustion chamber 15.

Engine 1 is provided with crank angle sensor 11. Control unit 50 determines engine speed Ne by counting a unit crank angle signal produced by crank angle sensor 11 in timed relation with the operation of engine 1 for a predetermined time or by measuring a period of a reference crank angle signal produced by crank angle sensor 11.

Further, engine 1 provided with coolant temperature sensor 12 for detecting temperature Tw of coolant within a water jacket (no numeral) of engine 1.

Further, engine 1 is provided with throttle sensor 13 for detecting the opening degree of throttle valve 4. Throttle sensor 13 can serve as an idle switch.

In this embodiment, throttle valve control device 14 is provided that can control the opening degree of throttle valve 4 by means of an actuator such as a DC motor.

Such throttle valve control device 14 can be structured so as to be capable of electronically controlling the opening degree of throttle valve 4 on the basis of a drive signal from control unit 50 so that a required torque that is calculated on the basis of an accelerator opening degree or the like can be attained.

The detection signals produced by the above described various sensors are inputted to control unit 50 that consists of a microcomputer having CPU, ROM, RAM, A/D converters and input/output interfaces. Control unit 50 controls the throttle opening of throttle valve 4 by means of throttle valve control device 14, drives fuel injection valve 5 to control the fuel injection quantity (fuel supply quantity) and determines the ignition timing for spark plug 6 to be ignited at the determined ignition timing.

In the meantime, control unit 50 is structured so as to be capable of changing the fuel injection period (fuel injection timing) in accordance with an operating condition of engine 1 so that in a predetermined engine operating condition (e.g., in a low to middle load engine operating region) fuel is injected into combustion chamber 15 on the compression stroke so as to form a stratified combustible mixture closely around spark plug 6 within combustion chamber 15 so that stratified combustion can be attained. On the other hand, in another engine operating condition (e.g., in a high-load engine operating region), fuel is injected into combustion chamber 15 on the intake stroke so as to form a homogeneous air-fuel mixture within entire combustion chamber 15 so that homogeneous combustion can be attained.

Indicated by 16 is an engine key switch that is turned to an OFF position, ON position or START position selectively.

The control at the time of switching of the combustion mode according to the present invention will now be described.

An air-fuel mixture formed within combustion chamber 15 by injection of fuel during the compression stroke in the stratified stoichiometric combustion mode has around a spark plug a layer that is richer than the stoichiometric air-fuel ratio. Thus, it is considered that the stratified stoichiometric combustion mode performs mixture formation similar to that of a normal stratified combustion mode. In such stratified combustion, combustion stability has a relation to the combustion efficiency determined depending upon the injection timing of fuel and the ignition timing. From FIG. 2, it will be seen that formation of a combustible mixture closely around the spark plug during the compression stroke requires a predetermined time (time for vaporization of fuel) after injection of fuel. Further, for making higher the exhaust temperature elevating effect during the stratified stoichiometric combustion, it will suffice to retard the ignition timing. When the fuel injection timing is retarded to this end, it is also necessary to retard the ignition timing for retaining the above described fuel evaporation time as shown in FIG. 3.

Figure 8:
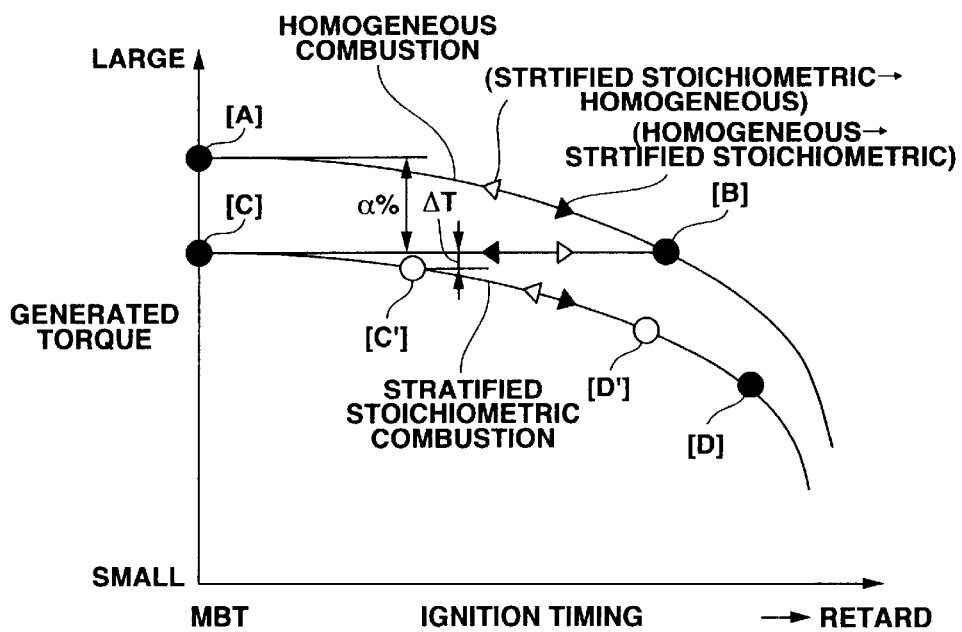
FIG. 8 is a view for illustrating an ignition timing control at the time of switching between homogeneous combustion and stratified stoichiometric combustion.

From the above-described combustion characteristics, an ignition timing control at the time of switching from the homogeneous combustion mode to the stratified stoichiometric combustion mode is executed in the following manner. Firstly, as shown in FIG. 8, the ignition timing in the homogeneous combustion mode is retarded to reduce a produced torque in a way as to make the torque produced in the homogeneous combustion mode be equal to that to be generated in the stratified stoichiometric combustion mode ([A]→[B] in FIG. 8). Then, the ignition timing is advanced all at once at the very moment of switching to the stratified stoichiometric combustion mode thereby suppressing a sudden and sharp variation of torque immediately after the switching of the combustion mode ([B]→[C] in FIG. 8).

However, as described hereinbefore, for suppressing a sudden and sharp variation of torque at the time of switching of the combustion mode, i.e., for advancing the ignition timing sufficiently by the amount offsetting the variation of torque, the fuel injection timing is selected so that the ignition timing can be advanced as much as possible. For this reason, after that, when the ignition timing retard control is executed based on the above described fuel injection timing, the retard is restricted within the narrow limits (retard limit remains at [D'] in FIG. 8).

In view of such phenomena, according to the present invention, a sudden and sharp variation of torque at the time of switching to the stratified stoichiometric combustion mode is eliminated sufficiently by executing the above-described controls as they are while maximumly accelerating elevation of the exhaust gas temperature that is an object of the stratified stoichiometric combustion.

Figure 4:
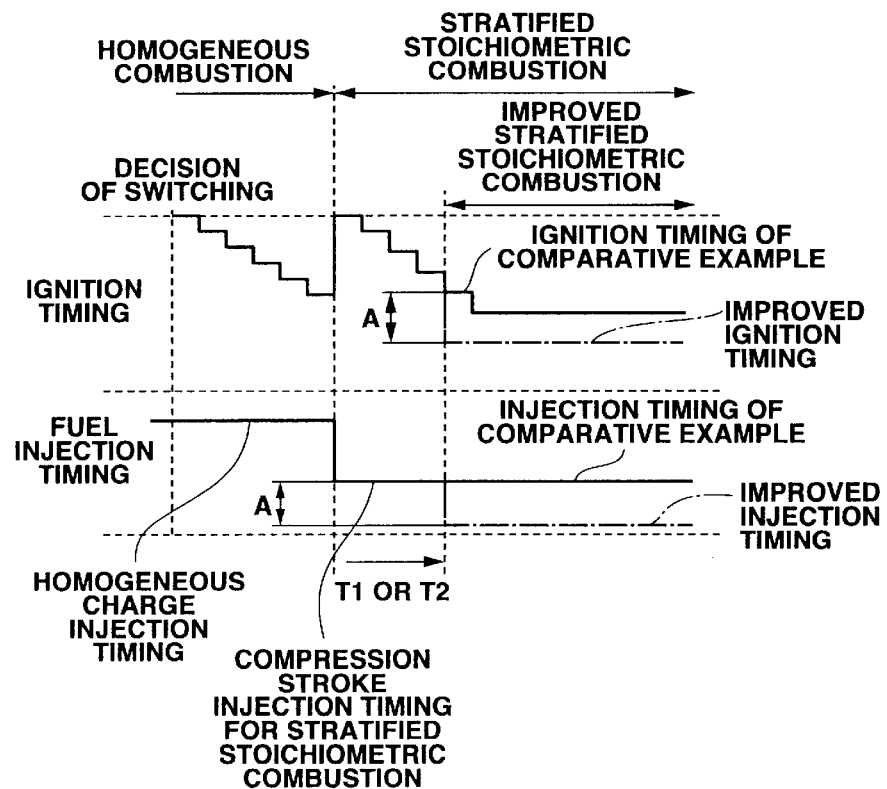
FIG. 4 is a diagrammatic view for illustrating switching of a combustion mode from a homogeneous combustion mode to a stratified stoichiometric combustion mode.

FIG. 4 shows the ignition timing control and fuel injection timing control at the time of switching from the homogeneous combustion mode to the stratified stoichiometric combustion mode. The ignition timing in the stratified stoichiometric combustion mode immediately after switching from the homogeneous combustion mode is determined in relation to the fuel injection timing that had been set on the advanced side in order that the ignition timing could have been advanced by an amount for offsetting the sudden and sharp variation of torque at the time of the switching of the combustion mode. Namely, the ignition timing can be advanced by an amount required at the time of the switching of the combustion mode, a sudden and sharp variation of torque at the time of the switching of the combustion mode can be suppressed sufficiently.

Then, in order that an exhaust gas temperature elevating effect due to late combustion inherent in stratified stoichiometric combustion can be obtained efficiently, the ignition timing is retarded after switching to the stratified stoichiometric combustion mode. As described above, in case the ignition timing is retarded with the fuel injection timing at the time of switching of the combustion mode being held unchanged, it is limited and cannot be retarded desirably. Thus, a technique that can retard the ignition timing beyond the above-described limit while maintaining the combustion stability described with respect to FIG. 3 is sought for.

In this connection, the ignition timing can be retarded beyond the above-described limit by retarding the ignition timing simultaneously with retard of the fuel injection timing before the ignition timing is retarded to the limit that is determined in accordance with the fuel injection timing at the time of switching of the combustion mode. As a result, the final ignition timing can be set on the more retarded side, thus making it possible to accelerate the late combustion within combustion chamber 15 and further within exhaust passage 7 thereby elevating the exhaust gas temperature and promoting the activation of catalytic converter 9 maximumly to improve the exhaust purification efficiency.

In this connection, the ignition timing can be retarded synchronously with retard of the fuel injection timing from the time immediately after switching of the combustion mode (as indicated by Δ in FIG. 3. and by C' in FIG. 8). However, if the ignition timing and fuel injection timing are so controlled, the advance amount of the ignition timing at the time of switching of the combustion mode is restricted within the narrower limits, thus decreasing the produced torque (as indicated by ΔT in FIG. 3) and causing a sudden and sharp variation of torque at the time of switching of the combustion mode to deteriorate the drivability.

For the above-described reason, the setting of the ignition timing from the time immediately after the switching of the combustion mode is not made synchronously with the setting of the fuel injection timing but a retard control of the ignition timing synchronous with that of the fuel injection timing is executed after the sudden and sharp variation of torque has been suppressed.

Then, a synchronous control of ignition timing and fuel injection timing according to this embodiment will be described.

FIG. 4 shows an ignition timing retard control after switching from the homogeneous combustion mode to the stratified stoichiometric combustion mode according to the first embodiment of the present invention. After the lapse of time T1 from start of the retard control (calculation of retard), the ignition timing is retarded to a target ignition timing (retard limit) synchronously with retard of the fuel injection timing. T1 is a period from the time when retard of the ignition timing is started to the time when the ignition timing is retarded to a point adjacent a retard limit corresponding to the fuel injection timing before retarded. T1 is determined based on the retard amount during the period T1 and the retarding rate per time in the calculation of the ignition timing. In this embodiment, the retard amount of the ignition timing is set nearly equal to the retard amount of the fuel injection timing.

Figure 5:
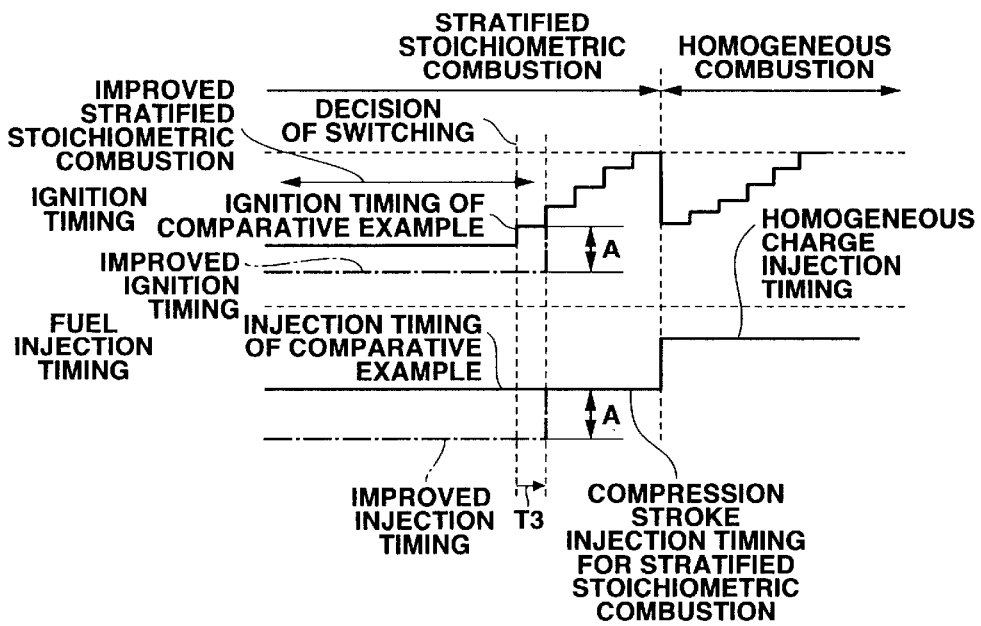
FIG. 5 is a view for illustrating switching of a combustion mode from a stratified stoichiometric combustion mode to a homogeneous combustion mode.

FIG. 5 shows switching from the stratified stoichiometric combustion mode to the homogeneous combustion mode. After the lapse of time T3 from decision of switching from the stratified stoichiometric combustion mode to the homogeneous combustion mode, the ignition timing is advanced synchronously with advance of the fuel injection timing. Thereafter, the ignition timing is advanced to a target ignition timing so that a sudden and sharp variation of torque is not caused at the time of switching to the homogenous combustion mode. At the time of the switching of the combustion mode, the ignition timing is retarded all at once. Thereafter, the ignition timing is advanced gradually to MBT or the advance limit in accordance with the operating condition of engine 1, and the control is ended.

The control for suppressing a sudden and sharp variation of torque at the time of switching from the homogeneous combustion mode to the stratified stoichiometric combustion mode and for elevating the exhaust gas temperature according the first embodiment will be described more in detail.

Figure 6:
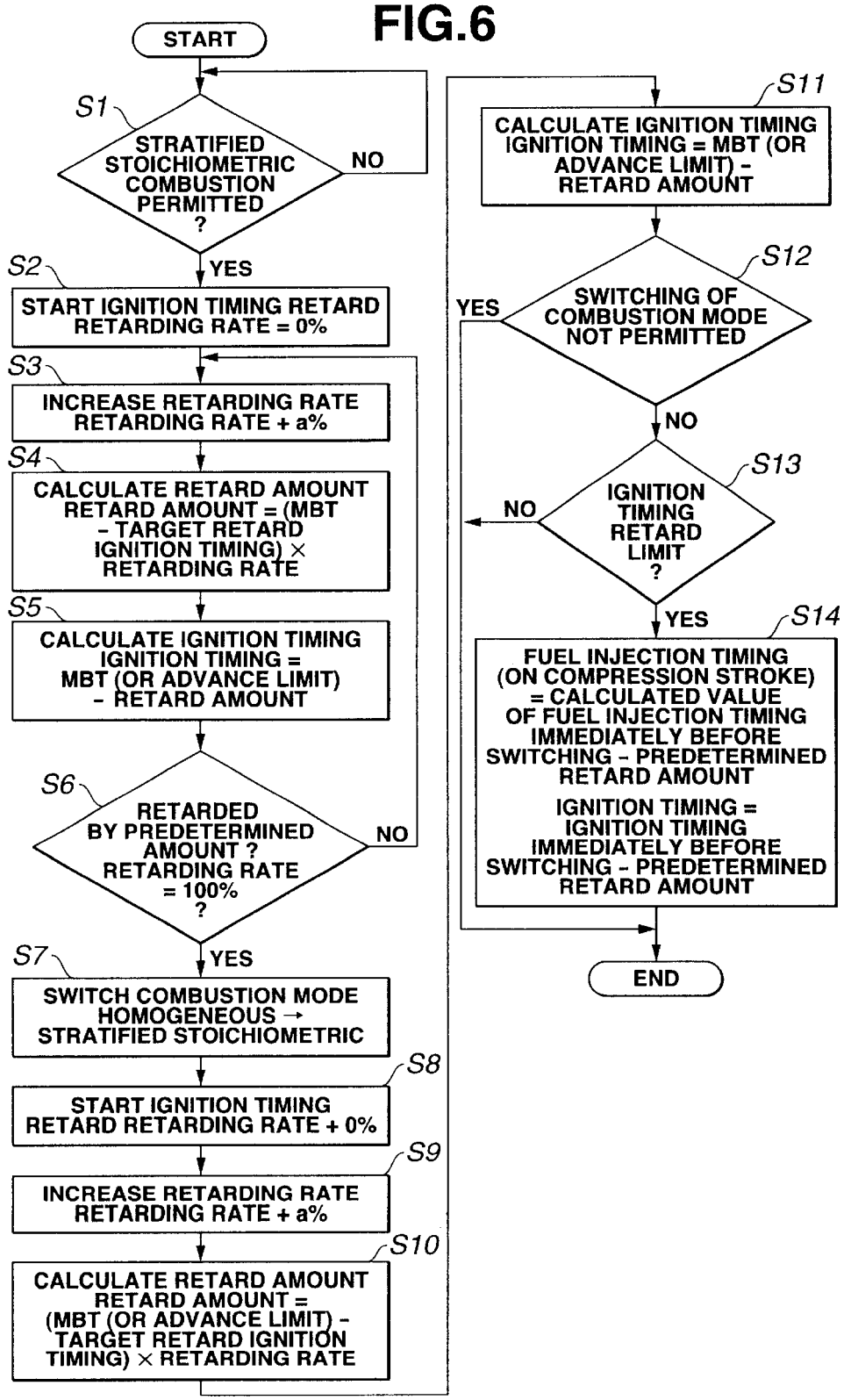
FIG. 6 is a flowchart of an ignition timing control at the time of switching from the homogeneous combustion mode to the stratified stoichiometric combustion mode according to a first embodiment of the present invention.

Firstly, an ignition timing correction control at the time of switching from the homogeneous combustion mode to the stratified stoichiometric combustion mode will be described with reference to the flowchart of FIG. 6.

In step S1, it is determined whether stratified stoichiometric combustion is permitted.

If stratified stoichiometric combustion is permitted, i.e., if there is a demand for switching from the present homogeneous combustion to stratified stoichiometric combustion for elevating the exhaust gas temperature, the program proceeds to step S2.

In step S2, a necessary ignition timing retarding correction control is started for preventing a sudden and sharp variation of torque at the time of switching of the combustion mode and the ignition timing retarding rate is set at 0%. Namely, at the time of switching from the homogeneous combustion mode to the stratified stoichiometric combustion mode, a correction for increasing the torque is required for eliminating or offsetting decrease of torque at the time of switching to stratified stoichiometric combustion that is lower in the thermal efficiency. However, since the ignition timing in the present homogeneous combustion mode is controlled toward MBT (Minimum Spark Advance for Best Torque) so as to attain a predetermined fuel consumption (or engine stability), there is not any amount by which the ignition timing can be advanced for increasing correction of torque if the ignition timing is held as it is. Thus, the ignition timing is retarded gradually until an ignition timing advancing correction amount for increasing correction of torque at the time of switching of the combustion mode can be attained.

In step S3, the retarding rate is increased by a predetermined amount for performing the above-described retarding correction gradually. Specifically, the retarding rate is increased by a % (e.g., 1%) every unit time (e.g., 10 ms).

In step S4, the retarding rate is calculated. Specifically, a target retard ignition timing is first calculated, for example by retrieval of information in a map, on the basis of engine speed and engine load (basic fuel injection quantity Tp, or the like) so that an ignition timing advancing correction amount that allows a torque increasing correction for suppressing a sudden and sharp variation of torque at the time of switching of the combustion mode is obtained, and the retard amount is calculated one by one from the following expression Retard amount=(*MBT*-Target retarding ignition timing)×Retarding rate In step S5, the ignition timing is finally calculated by the following expression.

Ignition timing=*MBT*(or Advance limit)-Retarding amount

In this manner, after a demand for switching of the combustion mode is made, the ignition timing is retarded gradually toward the above described target retard ignition timing ([A]→[B] in FIG. 8).

Instep S6, it is determined whether the ignition timing is equal to the above-described target retard ignition timing, based on whether the above-described retarding rate is 100%. If the decision is negative, the program returns back to step S3 to repeat the retarding correction.

If it is determined that the ignition timing is equal to the above-described target retard ignition timing, the program proceeds to step S7 where the combustion mode is switched from homogeneous combustion to stratified stoichiometric combustion. Specifically, injection of fuel by injector 5 is changed as follows. In the homogeneous combustion mode, injection of fuel is performed on the intake stroke. In the stratified stoichiometric combustion mode, injection of fuel is performed in portions dividedly on the intake stroke and on the compression stroke (divided injection).

Further, the program proceeds to step S8 where the above-described retarding rate is set at 0 (zero) simultaneously with switching of the combustion mode thereby returning the ignition timing to MBT, i.e., the timing before start of the above-described ignition timing retarding correction ([B]→[C] in FIG. 8). Namely, the ignition timing is advanced all at once by the amount corresponding to the total retarding amount by the above described retarding correction thereby suppressing a sudden and sharp variation of torque (α in FIG. 8) at the time of switching of the combustion mode. By this, a stable drivability can be attained.

In step S9 onward, the ignition timing is controlled so as to gradually get closer to an optimum target ignition timing in stratified stoichiometric combustion after the switching of the combustion mode.

Firstly, in step S9, the retarding rate is increased by a predetermined amount. Specifically, similarly to step S3, the retarding rate is increased by a % every unit time (e.g., 10 ms).

In step S10, the retard amount is calculated one by one. Namely, the target retarding ignition timing in the stratified stoichiometric combustion mode is calculated based on the engine speed and engine load (basic fuel injection quantity Tp or the like), for example, by retrieval of information in a map, and the retard amount is calculated one by one by using the following expression.

Retard amount=(*MBT*-Target retard ignition timing)

In this embodiment, the target retard ignition timing in the above-described stratified stoichiometric combustion mode is the timing that is retarded maximumly within the engine stability limits (drivability). This makes it possible to elevate the exhaust gas temperature maximumly. However, since the ignition timing can be retarded largely to such a degree as to attain an engine stability equal to that by the comparative example combustion mode, the exhaust gas temperature elevating effect can be made larger as compared with that of the comparative example combustion mode.

In step S11, the ignition timing is finally calculated by the following expression.

Ignition timing=*MBT*-Retard amount

In this manner, after switching of the combustion mode, the ignition timing is retarded gradually so as to become closer to the target retard ignition timing in the stratified stoichiometric combustion mode ([C]→[D'] in FIG. 8).

In step S12, it is determined whether the conditions for further retard of the ignition timing are satisfied. Specifically, it is determined whether switching of the combustion mode is not demanded after the above-described switching to the stratified stoichiometric combustion mode and retard of the ignition timing is now being demanded. If retard of the ignition timing is now being demanded, the program proceeds to step S13.

In step S13, it is determined whether the ignition timing calculated in step S11 is equal to an ignition timing retard limit (combustion stability limit for good drivability) corresponding to the present fuel injection quantity. Namely, the calculated value in step S11 (previously calculated in control unit 50) is compared with the target retard ignition timing calculated based on the engine speed and load (basic fuel injection quantity Tp, or the like) by retrieval of information in the map to determine whether the ignition timing is equal to the target retard ignition timing.

In step S13, if it is determined that the ignition timing is not equal to the target retard ignition timing, the program is ended. By this, the ignition timing is controlled to a value set in step S11. Specifically, spark plug 6 is ignited in response to a signal that is produced at a set ignition timing by control unit 50.

On the other hand, if it is determined in step S13 that the ignition timing is equal to the target retard ignition timing, the program proceeds to step S14.

In step S14, the final fuel injection timing (on the compression stroke) and the ignition timing are calculated by the following expressions, respectively.

Fuel injection timing (on the compression stroke)= Calculated value of fuel injection timing immediately before switching-Predetermined retard amount Ignition timing=Calculated value of ignition timing immediately before switching-Predetermined retard amount Here, the calculated value of fuel injection timing immediately before switching of the combustion mode is the latest fuel injection timing calculated by another program installed in control unit 50, and the calculated value of ignition timing immediately before switching of the combustion mode is the ignition timing calculated in step S11.

The predetermined retarding amount in the above-described fuel injection timing and the predetermined retard amount in the ignition timing can be of nearly the same value resultantly. However, since the retard limit of the ignition timing is shifted to the retard side in response to the retard amount of the fuel injection timing, it will do to set the retard amount of the ignition timing at a value corresponding to the amount of shifting of the retard limit.

By this, the ignition timing is retarded synchronously with retard of the fuel injection timing on the compression stroke for stratified stoichiometric combustion and is therefore shifted to the more retard side as compared with the control of the comparative example ([D']→[D] in FIG. 8).

By doing so, after switching to stratified stoichiometric combustion, the ignition timing can be retarded maximumly, thus making it possible to achieve an exhaust gas temperature elevating effect due to late combustion most efficiently.

In the meantime, the above-described synchronous retard of the fuel injection timing and ignition timing can be done dividedly in several portions. This makes it possible to attain the more gradual variation of torque.

Figure 7:
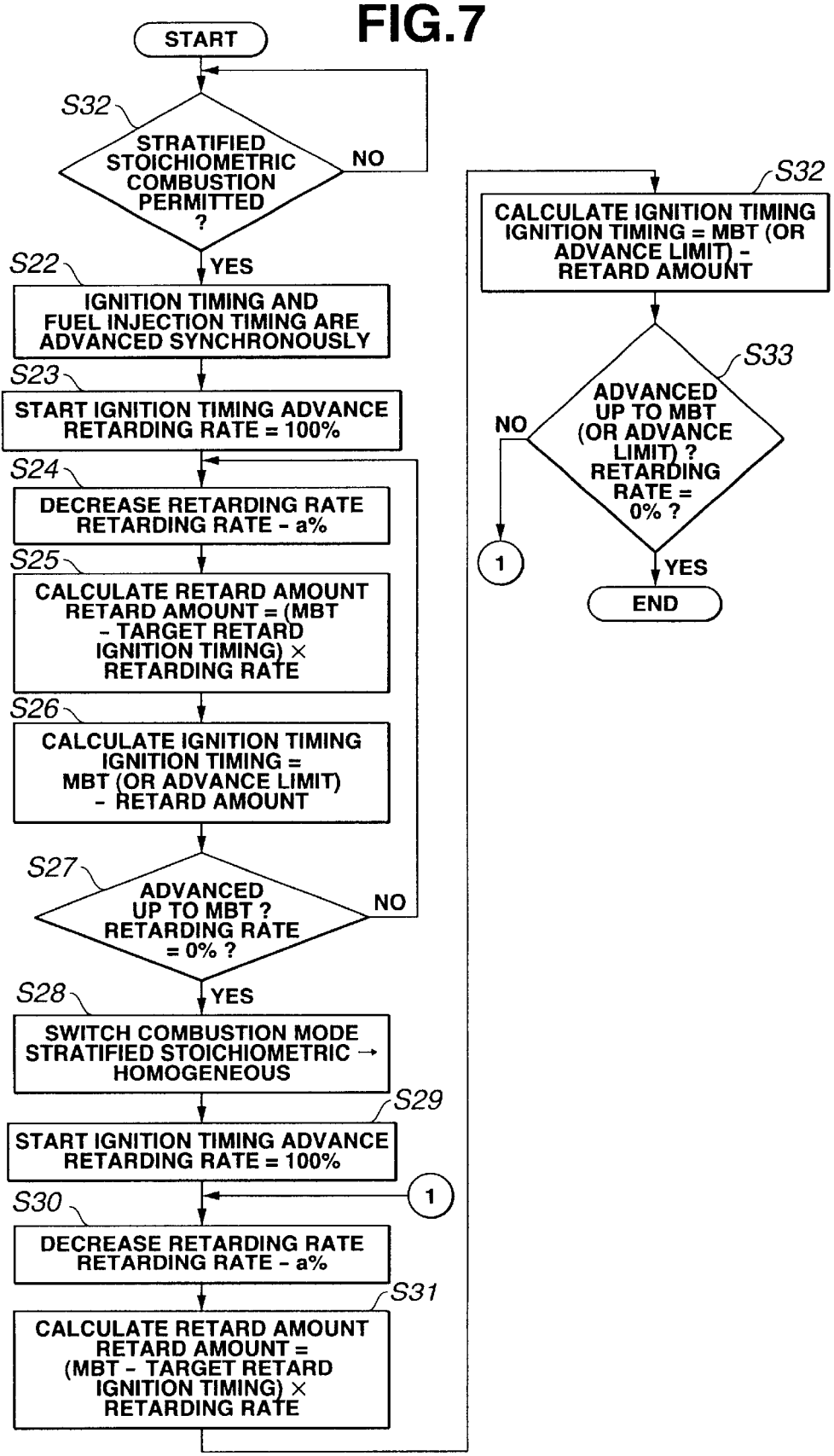
FIG. 7 is a flowchart of an ignition timing control at the time of switching from the stratified stoichiometric combustion mode to the homogeneous combustion mode according to the first embodiment;.

Then, referring the flowchart of FIG. 7, the ignition timing correction and fuel injection timing correction control at the time of switching from the stratified stoichiometric combustion mode to the homogeneous combustion mode will be described.

In step S21, it is determined whether homogeneous (stoichiometric) combustion is permitted.

If homogeneous combustion is permitted, i.e., in case warming-up of engine 1 has been completed and catalytic converter 9 has been activated or a demand for switching the combustion mode to homogeneous combustion due to a variation of a driving range to, for example, acceleration, the program proceeds to step S22 to start the ignition timing correction and fuel injection timing correction control necessary for preventing a sudden and sharp variation of torque at the time of switching of the combustion mode as shown in FIG. 5.

In this instance, the ignition timing and compression stroke injection timing are in a state of being maximumly retarded in a catalyst activation control.

In case the combustion mode is switched from stratified stoichiometric combustion to homogeneous combustion, the torque is required to be decreased so as to prevent increase of torque at the time of switching to homogeneous combustion that has a high thermal efficiency. However, since the ignition timing in the stratified stoichiometric combustion mode is maximumly retarded within engine stability limits in this embodiment as described above, further retard will cause the drivability to become unstable and therefore it is actually impossible to perform retard correction of the ignition timing. Thus, the ignition timing is retarded gradually until a retard amount that makes it possible to execute a torque decrease correction at the time of switching of the combustion mode is obtained.

Firstly, in step S22, in order that a maximum torque can be produced in the stratified stoichiometric combustion mode at the time of switching from the stratified stoichiometric combustion mode to the homogeneous combustion mode, the compression stroke injection timing and ignition timing are advanced by a predetermined amount [A] synchronously with each other after the lapse of a predetermined time (T3) from the time immediately after a decision of switching of the combustion mode. Namely, the compression stroke injection timing and ignition timing are advanced by the amount corresponding to the retard amount at the time of the switching from the homogeneous combustion mode to the stratified stoichiometric combustion mode in step S14.

Thereafter, the program proceeds to step S23 where an ignition timing advancing correction control necessary for suppressing a sudden and sharp variation of torque at the time of switching of the combustion mode is started and the initial value of the retarding rate is set at 100%.

In step S24, in order to perform the advancing correction gradually, the retarding amount is decreased by a predetermined amount. Specifically, the retarding rate is decreased by a % (e.g., 1%)every unit time (e.g., 10 ms).

In step S25, the retard amount is calculated. Specifically, MBT of the ignition timing in the homogeneous combustion mode after switching of the combustion mode is calculated, for example by retrieval of information in the map, on the basis of engine speed and engine load (basic fuel injection quantity Tp, or the like) and the retard amount is calculated one by one based on the thus obtained MBT and the ignition timing in the present stratified stoichiometric combustion, i.e., the target retard ignition timing by using the following expression.

Retard amount=($MBT$-Target retard ignition timing)×Retarding rate

In step S26, the ignition timing is finally calculated by the following expression.

Ignition timing=$MBT$-Retard amount

In this manner, after a demand for switching of the combustion mode occurs, the ignition timing is advanced gradually toward MBT in the homogeneous combustion mode.

In step S27, it is determined whether the ignition timing is equal to MBT, based on whether the retarding rate is equal to 100%. If it is determined that the ignition timing is not equal to MBT, the program is returned repeatedly to step S24 to advance the ignition timing gradually until the ignition timing becomes equal to MBT. If it is determined that the ignition timing is equal to MBT, the program proceeds to step S28 where the combustion mode is switched from stratified stoichiometric combustion to homogeneous combustion. Specifically, fuel injection by fuel injector 5 is changed so as to be performed only on the intake stroke thereby switching the combustion mode to homogeneous combustion.

Further, the program proceeds to step S29 where the ignition timing is corrected simultaneously with switching of the combustion mode so as to retard all at once by a predetermined amount corresponding to an amount that can eliminate or offset an increase of torque at the time of switching of the combustion mode thereby switching the ignition timing to the target retard ignition timing for suppressing a sudden and sharp variation of torque in the homogeneous combustion mode([C]→[B] in FIG. 8).

By this, it becomes possible to suppress a sudden and sharp variation of torque at the time of switching of the combustion mode (α in FIG. 8) and a stable drivability can be attained.

In step S30 onward, the ignition timing is controlled so as to gradually become closer to MBT in the homogeneous combustion mode after switching of the combustion mode.

Firstly, in step S30, the retarding rate is decreased by a predetermined amount. Specifically, similarly to step S24, the retarding rate is decreased by a % (e.g., 1%) every unit time (e.g., 10 mg).

In step S31, the retard amount is calculated one by one. Namely, the retard amount is calculated one by one based on MBT in the homogeneous combustion mode and the target retard ignition timing immediately after switching of the combustion mode for suppressing a sudden and sharp variation of torque, and by using the following expression.

Retard amount=($MBT$-Target retard ignition timing)×Retarding rate

In step S32, the ignition timing is finally calculated by the following expression.

Ignition timing=$MBT$-Retard amount

In this manner, after switching of the combustion mode, the ignition timing is advanced gradually so as to gradually become closer to MBT in the homogeneous combustion mode ([B]→[A] in FIG. 8).

In step S33, it is determined whether the ignition timing is equal to the above-described MBT, based on whether the retarding rate is 0%. If it is determined that the ignition timing is not equal to MBT, the program is returned repeatedly to step S24 to advance the ignition timing gradually until the ignition timing becomes equal to MBT.

In this manner, a sudden and sharp variation of torque at the time of switching form the stratified stoichiometric combustion mode for elevating the exhaust gas temperature to the homogeneous combustion mode after completion of warming-up of engine 1 can be suppressed.

Referring to the flowchart of FIG. 12, a second embodiment will be described.

In the first embodiment, as described with reference to FIG. 4, the interval between the time when the combustion mode is switched from the homogeneous combustion mode to the stratified stoichiometric combustion mode and the time when the maximum retard control is executed is T1 that is determined uniformly based on the ignition timing retard limit corresponding to the fuel injection timing before retard. In the second embodiment, the time at which the maximum retard control is started is varied in accordance with the engine speed and/or engine load (Tp).

With reference to FIG. 4, it has been described that after switching of the combustion mode, a retard control of ignition timing is executed for activation of catalytic converter 9 (refer to FIG. 1). A control of this embodiment is adapted so that the time at which the maximum retard of the ignition timing is started can be varied. Increase of the engine speed and engine load causes the intake air quantity and therefore exhaust gas quantity to increase, thus causing the exhaust gas temperature to rise. The time necessary for activation of catalytic converter 9 can therefore be shortened or excessive retard of the ignition timing becomes unnecessary. Excessive retard of the ignition timing deteriorates the fuel consumption and therefore retard of the ignition timing more than necessitated should be avoided.

To solve such a problem, the ignition timing retard control is executed in accordance with the engine speed and load in this embodiment. By this, activation of catalytic converter 9 can be performed optimally without deteriorating the fuel consumption.

Figure 12:
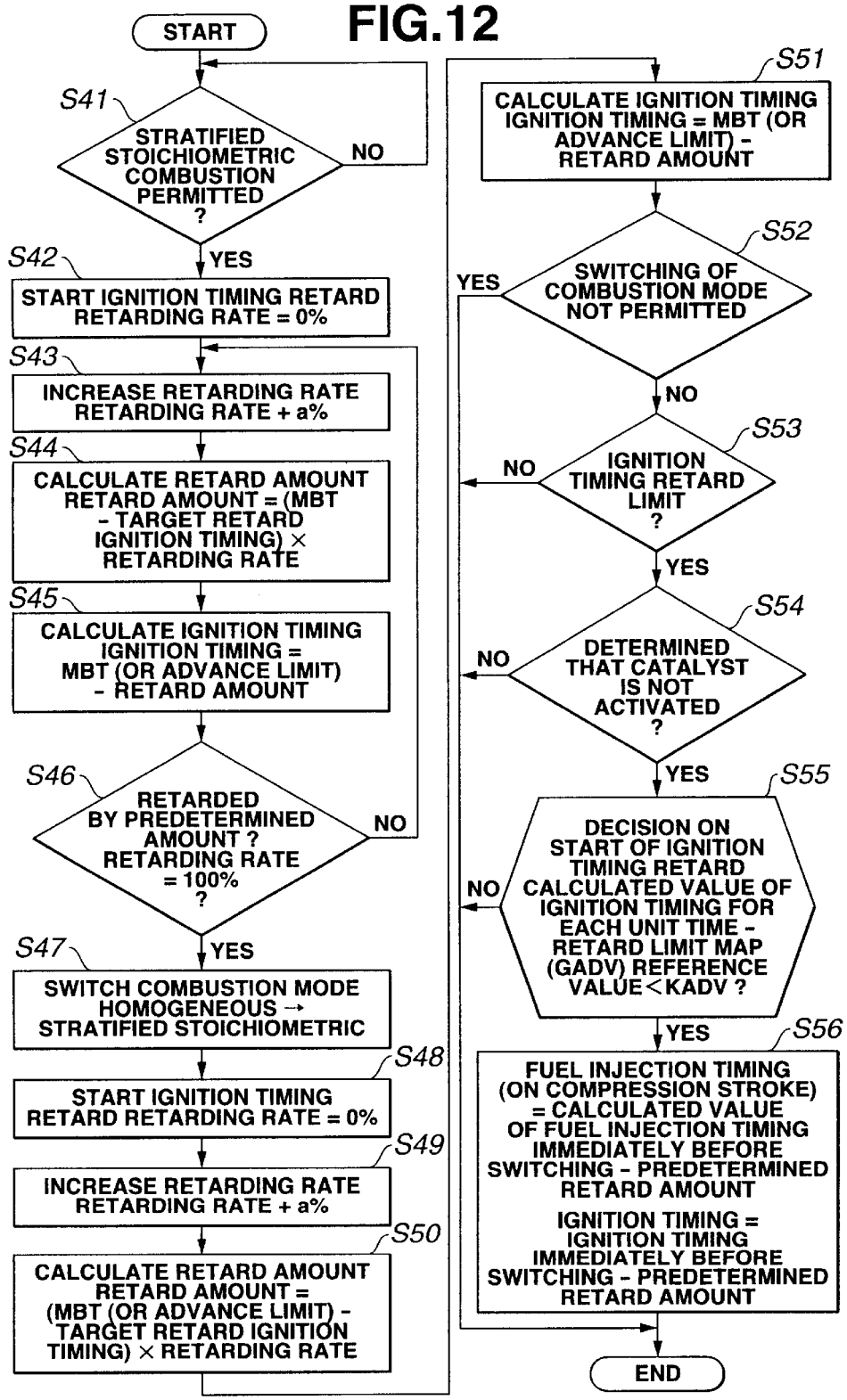
FIG. 12 is a flowchart of an ignition timing control according to the second embodiment of the present invention.

In the flowchart of FIG. 12, steps S41 to S53 are the same as the steps S1 to S13, respectively.

In step S54, it is determined whether catalytic converter 9 is activated. If it is determined that catalytic converter 9 is not activated, the program proceeds to step S55.

Figure 9:
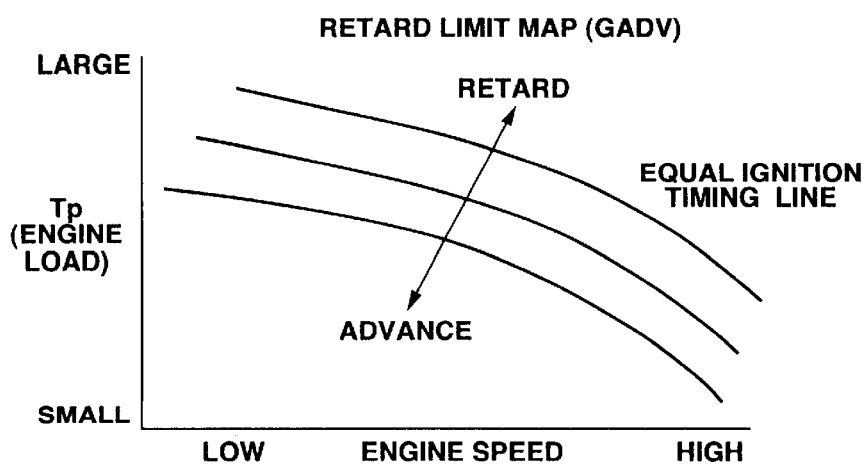
FIG. 9 is a map of retard limit GADV used in an ignition timing control at the time of switching from the homogeneous combustion mode to the stratified stoichiometric combustion mode.
Figure 10:
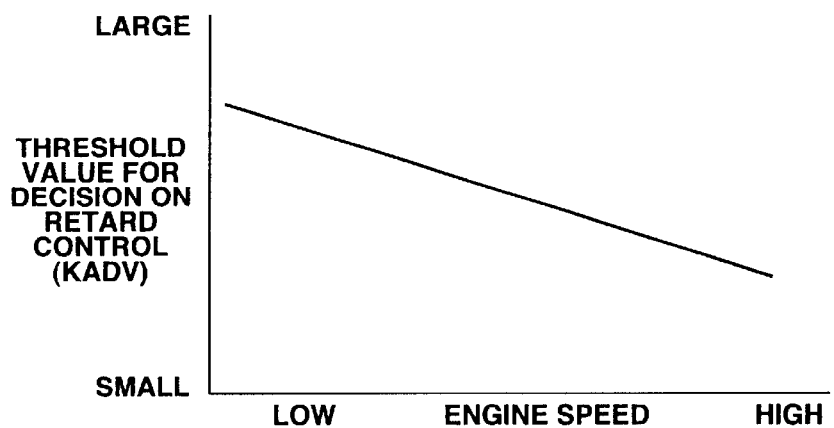
FIG. 10 is a map of a threshold value KADV using an engine speed as a parameter and used for an ignition timing control according to a second embodiment of the present invention.
Figure 11:
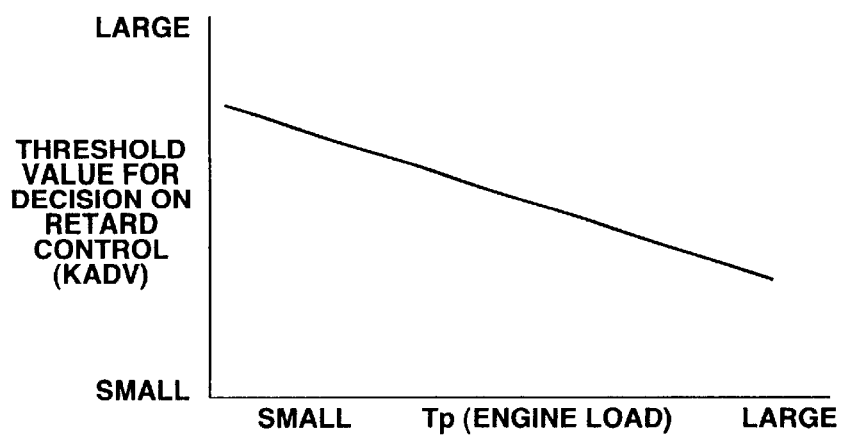
FIG. 11 is a map of a threshold value KADV using an engine load as a parameter and used for an ignition timing control according to the second embodiment of the present invention.

In step S55, a decision is made as to the time at which a maximum retard control is started (time T2 from start of switching of combustion mode) after the combustion mode is switched from homogeneous combustion to stratified stoichiometric combustion. Specifically, a difference between a calculated value of ignition timing for each unit time, which ignition timing is calculated every unit time (e.g., 2 ms) after switching of the combustion mode, and a reference value of an ignition timing retard limit map (GAVD) prepared using the engine speed and engine load (Tp) as parameters as shown in FIG. 9 is calculated and it is determined that it is the time for start of the maximum retard control when the difference becomes smaller than a threshold value (KADV). The threshold value (KADV) is set in accordance with the engine speed and engine load (Tp) as shown in FIGS. 10 and 11. The decision on the time for start of the maximum retard control is made by using either of the engine speed or engine load (Tp), or by using both of the engine speed and engine load (Tp) so that the decision is made based on whether both of or one of the engine speed and engine load (Tp) satisfies the requirement. Further, the threshold value (KADV) can be set at the more appropriate value when set by using a three-dimensional map prepared based on the threshold value (KADV), engine speed and engine load (Tp).

Ignition is performed at the timing calculated in step S51 until it becomes the time to start the maximum retard control. When it is determined that it is the time to start the maximum retard control, the program proceeds to step S56 where calculation for retarding the final fuel injection timing (on the compression stroke) and the ignition timing by a predetermined amount is made and the control for retarding the ignition timing synchronously with retard of the fuel injection timing is executed similarly to the first embodiment.

The entire contents of Japanese Patent Application P2001-216214 (filed Jul. 17, 2001) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A control system for a direct-injection spark-ignition internal combustion engine comprising:

a fist control section for switchably controlling, in accordance with an operating condition of the engine, a combustion mode of the engine between a homogeneous combustion mode wherein a homogeneous air-fuel mixture is formed in an entire combustion chamber by single injection of fuel and a stratified stoichiometric combustion mode wherein a rich air-fuel mixture of an air-fuel ratio equal to or richer than a stoichiometric air-fuel ratio is formed around a spark plug by injection of fuel on a compression stroke and a lean air-fuel mixture of an air-fuel ratio leaner than the stoichiometric air-fuel ratio is formed around the rich air-fuel mixture by injection of fuel on an intake stroke; and a second control section for advancing, at a time of switching from the homogeneous combustion mode to the stratified stoichiometric combustion mode, an ignition timing by an amount for offsetting a variation of torque of the engine simultaneously with the switching of the combustion mode, retarding the ignition timing gradually after the switching of the combustion mode, and retarding, after the ignition timing has been retarded by a predetermined amount, a compression stroke fuel injection timing in the stratified stoichiometric combustion mode while retarding the ignition timing further.

2. A control system according to claim 1, wherein the second control section operates the engine in the stratified stoichiometric combustion mode when there is a demand for elevating a temperature of a catalytic converter disposed in an exhaust passage of the engine.

3. A control system according to claim 1, wherein an average air-fuel ratio of the air-fuel mixture formed in the entire combustion chamber at the time of the stratified stoichiometric combustion mode is nearly stoichiometric.

4. A control system according to claim 1, wherein the higher an engine speed, the more retarded is the time at which the further retard of the ignition timing together with the retard of the fuel injection timing is started.

5. A control system according to claim 1, wherein the larger an engine load, the more retarded is the time at which the retard of the ignition timing together with retard of the fuel injection timing is started.

6. A control system according to claim 1, wherein the second control section is configured to calculate an ignition timing every unit time to obtain a calculated value of the ignition timing per unit time, calculate a difference between the calculated value of the ignition timing and a reference value of an ignition timing retard limit obtained by using an ignition timing retard limit map based on an engine speed and engine load, and determine that it is the time to start the further retard of the ignition timing together with the retard of the fuel injection timing when the difference between the calculated value of the ignition timing and the reference value of the ignition timing retard limit is smaller than a threshold value that is determined by using a map based on the engine speed and engine load.

7. A control system according to claim 6, wherein the higher the engine speed, the smaller the threshold value becomes.

8. A control system according to claim 6, wherein the larger the engine load, the larger the threshold value becomes.

9. A control system according to claim 1, wherein the ignition timing is retarded gradually before switching from the homogeneous combustion mode to the stratified stoichiometric combustion mode.

10. A control system according to claim 1, further comprising a third control section for advancing, at a time of switching from the stratified stoichiometric combustion mode to the homogenous combustion mode, a compression stroke fuel injection timing in the stratified stoichiometric combustion mode while advancing the ignition timing, gradually advancing the ignition timing further, retarding, after the gradual and further advancing of the ignition timing, the ignition timing by an amount for offsetting a variation of torque simultaneously with switching of the combustion mode, and after the switching of the combustion mode, gradually advancing the ignition timing up to a timing suited for the homogeneous combustion mode.

11. A method of controlling a direct-injection spark-ignition internal combustion engine comprising:

switchably controlling, in accordance with an operating condition of the engine, a combustion mode of the engine between a homogeneous combustion mode wherein a homogeneous air-fuel mixture is formed in an entire combustion chamber by single injection of fuel and a stratified stoichiometric combustion mode wherein a rich air-fuel mixture of an air-fuel ratio equal to or richer than a stoichiometric air-fuel ratio is formed around a spark plug by injection of fuel on a compression stroke and a lean air-fuel mixture of an air-fuel ratio leaner than the stoichiometric is formed around the rich air-fuel mixture by injection of fuel on an intake stroke; and advancing, at a time of switching from the homogeneous combustion to the stratified stoichiometric combustion, an ignition timing by an amount for offsetting a variation of torque of the engine simultaneously with switching of the combustion mode, retarding the ignition timing gradually after the switching of the combustion mode, and retarding, after the ignition timing has been retarded by a predetermined amount, a compression stroke fuel injection timing in the stratified combustion while retarding the ignition timing further.

12. A method according to claim 11, wherein the combustion mode is switched to the stratified stoichiometric combustion mode when there is a demand for elevating a temperature of a catalytic converter disposed in an exhaust passage of the engine.

13. A method according to claim 11, wherein an average air-fuel ratio of the air-fuel mixture formed in the entire combustion chamber in the stratified stoichiometric combustion mode is nearly stoichiometric.

14. A method according to claim 11, wherein the higher an engine speed, the more retarded is the time at which the further retard of the ignition timing together with the retard of the fuel injection timing is started.

15. A method according to claim 11, wherein the larger an engine load, the more retarded is the time at which the retard of the ignition timing together with the retard of the fuel injection timing is started.

16. A method according to claim 11, wherein the further retarding of the ignition timing comprising calculating an ignition timing every unit time to obtain a calculated value of the ignition timing per unit time, calculating a difference between the calculated value of the ignition timing and a reference value of an ignition timing retard limit obtained by using an ignition timing retard limit map based on an engine speed and engine load, and determining that it is the time to start the further retard of the ignition timing together with the retard of the fuel injection timing when the difference between the calculated value of the ignition timing and the reference value of the ignition timing retard limit is smaller than a threshold value that is determined by using a map based on the engine speed and engine load.

17. A method according to claim 16, wherein the higher the engine speed, the smaller the threshold value becomes.

18. A method according to claim 16, wherein the larger the engine load, the larger the threshold value becomes.

19. A method according to claim 11, wherein the ignition timing is retarded gradually before switching from the homogeneous combustion mode to the stratified stoichiometric combustion mode.

20. A method according to claim 11, further comprising advancing, at a time of switching from the stratified stoichiometric combustion mode to the homogenous combustion mode, a compression stroke fuel injection timing in the stratified stoichiometric combustion mode while advancing the ignition timing, gradually advancing the ignition timing further, retarding, after the gradual and further advancing of the ignition timing, the ignition timing by an amount for offsetting a variation of torque of the engine simultaneously with switching of the combustion mode, and after the switching of the combustion mode, gradually advancing the ignition timing up to a timing suited for the homogeneous combustion mode.

* * * * *